(12) United States Patent
Ehrlich et al.

(10) Patent No.: US 11,050,099 B2
(45) Date of Patent: Jun. 29, 2021

(54) ENERGY STORAGE MODULE COMPRISING A TEMPERATURE MANAGEMENT SYSTEM, AND ENERGY STORAGE SYSTEM

(71) Applicant: Clarios Advanced Solutions GmbH, Hannover (DE)

(72) Inventors: Bernhard Ehrlich, Neustadt am Rubenberge (DE); Ralf Joswig, Buchholz (DE); Helge Brenner, Hannover (DE); Christian Kuper, Barsinghausen (DE)

(73) Assignee: Clarios Advanced Solutions GmbH, Hannover (DE)

( * ) Notice: Subject to any disclaimer, the term of this patent is extended or adjusted under 35 U.S.C. 154(b) by 56 days.

(21) Appl. No.: 16/332,336

(22) PCT Filed: Oct. 5, 2017

(86) PCT No.: PCT/EP2017/075341
§ 371 (c)(1),
(2) Date: Mar. 11, 2019

(87) PCT Pub. No.: WO2018/065516
PCT Pub. Date: Apr. 12, 2018

(65) Prior Publication Data
US 2019/0237831 A1    Aug. 1, 2019

(30) Foreign Application Priority Data

Oct. 5, 2016  (DE) .......................... 102016118864.6

(51) Int. Cl.
*H01M 10/653* (2014.01)
*H01M 10/625* (2014.01)
(Continued)

(52) U.S. Cl.
CPC ........... *H01M 10/653* (2015.04); *B60L 58/24* (2019.02); *H01M 10/0525* (2013.01);
(Continued)

(58) Field of Classification Search
CPC ........... H01M 10/653; H01M 10/6551; H01M 10/6556; H01M 10/6554; H01M 10/613;
(Continued)

(56) References Cited

U.S. PATENT DOCUMENTS

| 2015/0247684 A1 | 9/2015 | Himmer et al. |
| 2016/0056512 A1 | 2/2016 | Schmid et al. |
| 2018/0034121 A1* | 2/2018 | Kwon ................. H01M 2/1094 |

FOREIGN PATENT DOCUMENTS

| DE | 102014203846 A1 | 9/2015 |
| EP | 2475025 A1 | 7/2012 |
| EP | 102013206581 A1 | 10/2014 |

OTHER PUBLICATIONS

International Search Report and Written Opinion for PCT/EP2017/075341 dated Nov. 14, 2017, 3 pages.

* cited by examiner

*Primary Examiner* — Stewart A Fraser
(74) *Attorney, Agent, or Firm* — Boardman & Clark LLP (57) ABSTRACT

Disclosed is an energy storage module for use in a vehicle, in particular in a hybrid vehicle, said energy storage module comprising a plurality of energy storage cells and a temperature management system for the associated energy storage cells, the temperature management system being associated with at least some, preferably all energy storage cells. The temperature management system has a heat exchanger and a heat conducting element; furthermore, a reinforcement
(Continued)

layer, which has a higher modulus of elasticity than the heat exchanger, is provided between the heat exchanger and the heat conducting element.

18 Claims, 1 Drawing Sheet

(51) Int. Cl.
| | |
|---|---|
| *H01M 10/647* | (2014.01) |
| *H01M 10/6551* | (2014.01) |
| *H01M 10/6556* | (2014.01) |
| *H01M 10/6554* | (2014.01) |
| *B60L 58/24* | (2019.01) |
| *H01M 10/613* | (2014.01) |
| *H01M 10/658* | (2014.01) |
| *H01M 10/0525* | (2010.01) |
| *H01M 10/656* | (2014.01) |
| *H01M 10/04* | (2006.01) |
| *H01M 10/052* | (2010.01) |

(52) U.S. Cl.
CPC ....... *H01M 10/613* (2015.04); *H01M 10/625* (2015.04); *H01M 10/647* (2015.04); *H01M 10/658* (2015.04); *H01M 10/6551* (2015.04); *H01M 10/6554* (2015.04); *H01M 10/6556* (2015.04); *H01M 10/0431* (2013.01); *H01M 10/052* (2013.01); *H01M 10/656* (2015.04); *Y02E 60/10* (2013.01); *Y02T 10/70* (2013.01)

(58) Field of Classification Search
CPC .......... H01M 10/658; H01M 10/0525; H01M 10/625; H01M 10/647
See application file for complete search history.

ENERGY STORAGE MODULE COMPRISING A TEMPERATURE MANAGEMENT SYSTEM, AND ENERGY STORAGE SYSTEM

CROSS REFERENCE TO RELATED APPLICATIONS

This application is a U.S. National Stage Application under 35 U.S.C. § 371 of International Application No. PCT/EP2017/075341 entitled "ENERGY STORAGE MODULE COMPRISING A TEMPERATURE MANAGEMENT SYSTEM AND ENERGY STORAGE SYSTEM," filed on Oct. 5, 2017, which claims priority to and the benefit of Application No. DE 102016118864.8, filed Oct. 5, 2016, which are hereby incorporated by reference in their entirety for all purposes.

DESCRIPTION

The present invention relates to an energy storage module comprising a temperature management system, and to an energy storage system comprising an energy storage module of this kind.

Energy storage modules and/or energy storage systems are usually equipped with a temperature management system of the energy storage module or of the energy storage system. In conventional practice, the temperature management system has a heat conducting element and a heat exchanger, wherein the heat conducting element is arranged directly on the heat exchanger, more specifically in the direction of an interior of the energy storage module or of the energy storage system.

The temperature management system of the energy storage module or of the energy storage system is provided for the purpose of keeping the temperature of a multiplicity of energy storage cells in a predefined or predefinable temperature range. For this purpose, heat arising during the operation of the multiplicity of energy storage cells can be dissipated from the energy storage module or the energy storage system, for example. Heat can also equally well be fed to the energy storage cells.

For this purpose, the heat conducting element is in contact on one side with at least some of the energy storage cells and on the other side with the heat exchanger. If the heat exchanger expands or contracts, or even bends, to different extents, e.g. due to temperature differences or temperature changes in various regions, contact between the heat conducting element and the energy storage cells and/or contact between the heat conducting element and the heat exchanger may be impaired, or the heat conducting element may even be separated from the energy storage cells and/or the heat exchanger. This can likewise be caused by external mechanical influences, e.g. mechanical shock, vibrations and the like.

On the one hand, this reduces the capability of the temperature management system since, according to inadequate contacting of the heat conducting element, the heat can no longer be conducted out of or into the energy storage module or out of or into the energy storage system, or only to a limited extent, resulting in the first case in an increase in the temperature of the energy storage cells and in the second case in an increase in the time required for heating of the energy storage cells—and hence a reduction in the functional spectrum of the energy storage system.

Normally, conventional heat conducting elements are produced from elastoplastic materials as a carrier substance for the heat conducting element, wherein the carrier substance on its own has a low thermal conductivity. For this reason, an additive is generally mixed in with the carrier substance. In many cases, the additive has ceramic particles. Particles of this kind can move relative to one another and/or relative to the carrier substance owing to vibrations and/or shocks caused by vehicle movements, for example, and this can lead to weakening of the carrier substance due to abrasive wear. This, in turn, reduces the mechanical stress resistance levels of the heat conducting element. As a result, damage to the material is possible, it being possible, in particular, for cracks to form in the heat conducting element. As a consequence of this effect, one or more energy storage cells may also penetrate the heat conducting element, for example, and thus make contact with the heat exchanger, and this can lead to a short circuit or at least to spontaneous discharge of the energy storage cells.

Embrittlement of the heat conducting element can also be caused by diffusion of plasticizers from the carrier substance of the heat conducting element, and this can lead to increasing cracking of the heat conducting element. As a result, the elastic properties of the heat conducting element are reduced, and this can lead to increasing deterioration in the mechanical and functional properties of the heat conducting element.

In a case where the quantity of material of the heat conducting element between surfaces of the heat exchanger and the energy storage cell(s) decreases, for example, the electric resistance and thermal resistance between these surfaces remain low as long as the surfaces of the heat exchanger and/or the energy storage cell(s) continue to make contact with the heat conducting element. However, if air replaces the decreasing quantity of material of the heat conducting element, e.g. in the case of separation of the heat conducting element from the surface of the heat exchanger and/or of the energy storage cell(s), at least in some region or regions, and thus there is inadequate contact between the heat conducting element and the surface of the heat exchanger and/or of the energy storage cell(s), both the electric resistance and the thermal resistance rise.

On the other hand, a short circuit can be caused, namely when more than one potential-carrying cell housing comes into contact with the heat exchanger, or when the heat exchanger has a different electric potential from the energy storage cell(s) making contact. In a less extreme case, the energy storage cells can be spontaneously discharged if the contact with the heat conducting element has a low electric resistance.

Although not explained in detail, it can be assumed that some of the above mentioned problems were the cause of the overheating of the lithium-ion batteries used in the Boeing 787 2012/2013 aircraft.

It is therefore the underlying object of the invention to provide an improved and robust energy storage module and/or energy storage system which does not have the disadvantages of the prior art and can furthermore be produced in a simple and low-cost manner.

Regarding the energy storage module, the object on which the invention is based is achieved according to the invention by the subject matter of independent claim 1. Advantageous developments are specified in the dependent claims.

Thus, according to the invention, an energy storage module for use in a vehicle, in particular for use in a hybrid vehicle, is specified. In this case, the energy storage module has a multiplicity of energy storage cells and a temperature management system associated with at least some, preferably all, of the energy storage cells. The temperature management system, in turn, has a heat exchanger and a heat conducting element, wherein a reinforcement layer is provided or arranged between the heat exchanger and the heat conducting element, wherein the reinforcement layer has a higher modulus of elasticity than the heat exchanger.

The advantages of the invention are obvious. The known problems can be solved by the provision of a temperature management system according to the invention. Thus, a reinforcement layer between the heat conducting element and the heat exchanger leads to higher mechanical and thermal stability of the surface of the heat exchanger with virtually unchanged elastic properties of the temperature management system, in particular of the heat exchanger with the reinforcement layer.

Moreover, the thermal conductivity of the temperature management system is also not impaired, in particular by virtue of a suitable choice of reinforcement layer, thereby furthermore enabling heat to be dissipated from the energy storage module or heat to be fed into the energy storage module.

Moreover, there is the possibility, with unchanged functional system requirements, to reduce the thickness of the heat conducting element by the functional component for electric insulation, which is already being performed by the provision of the reinforcement layer. This offers the possibility of limiting the thickness of the heat conducting element to the required function of heat conduction and compensation of external mechanical influences, e.g. mechanical shock, vibrations and the like. It is thereby possible (in certain circumstances) to bring about a lower thermal resistance of the heat conducting element. This allows a higher heat flow between the energy storage cells and the heat exchanger, more specifically without leaving the predefined or predefinable temperature range, this in turn allowing a higher electric current in the energy storage system and, on the other hand, to the extent that heating by external heat sources is required, allowing a higher heat flow into the energy storage system. This means an increase in the range of application of the energy storage system.

In conventional heat conducting elements, the problem can furthermore arise that, owing to the hydrophilic material properties of the heat conducting element, the electrical conductivity thereof may be increased by the absorption of condensed water, wherein the condensation can take place within the energy storage system, for example.

Moreover, steam could move—even in very small surface roughness structures between the surfaces of the conventional heat conducting element and the surfaces of the energy storage cells or of the heat exchanger—parallel to these surfaces and could condense at points at which the temperature of the surface is lower than the temperature of the steam. This can likewise increase the electrical conductivity between the energy storage cells and the heat exchanger. Moreover, the condensate formed can bring about negative effects on the surfaces of the energy storage cells or the heat exchanger and on the surfaces of the heat conducting element.

These problems are solved with the reinforcement layer according to the invention, which is arranged on a surface of the heat exchanger, namely between the heat exchanger and the heat conducting element, since the reinforcement layer on the one hand performs the function of electric insulation, at least in part, in particular for the most part or completely, and because no moisture—such as the condensed water—can get between the reinforcement layer and the heat exchanger.

By virtue of the fact that the surface pressure between the energy storage cells, the heat conducting element and the heat exchanger with the reinforcement layer can preferably in each case be dependent inter alia on the modulus of elasticity, the thickness and area of the heat conducting element and a force which acts via the surface(s) of the energy storage cell(s) on the heat conducting element and is absorbed by the heat exchanger, continuous reliable contact is provided. The reinforcement layer is furthermore designed in such a way as to provide electric insulation and, by virtue of the high mechanical resistance of the reinforcement layer, to prevent penetration of conductive elements, in particular direct contact between the energy storage cells and the heat exchanger.

Moreover, the reinforcement layer should preferably be as hard as possible, i.e. at least substantially nondeformable. Nevertheless, the elastic properties of the temperature management system, in particular of the heat exchanger with the reinforcement layer, can be maintained virtually constant, while the surface hardness of the heat exchanger with the reinforcement layer is simultaneously high.

In particular, this makes it possible to reduce bending of the heat exchanger and, as a result, separation of the heat conducting element from the multiplicity of energy storage cells on one side and from the heat exchanger on the other side. This also reduces the risk of a short circuit of individual energy storage cells in the energy storage module.

Thus, through the provision of a reinforcement layer of this kind, it is possible to improve the safety of the entire energy storage system, namely by virtue of the fact that, even in a case in which at least one energy storage cell penetrates the heat conducting element, e.g. owing to external mechanical forces lasting for a prolonged period of time, electric insulation is ensured on the one hand, while a heat flow from or to the energy storage cells is nevertheless maintained. As a result, no additional electric current can flow between two energy storage cells penetrating the heat conducting element, providing protection from irreversible damage to the energy storage cells and to adjacent energy storage cells and the energy storage system due to overheating of the energy storage cells or the energy storage system.

Moreover, the provision of the reinforcement layer makes it possible to make the heat conducting element thin since, inter alia, the reinforcement layer at least partially, preferably very largely or completely, performs the function of electric insulation. This is advantageously associated with a reduction of the thermal resistance, which depends inter alia on the thickness and on the thermal properties of the elements through which a heat flow is to pass. A lower thermal resistance in turn allows a higher heat flow from or to the energy storage cells. This once again enables higher electric currents to be output by the energy storage system or to be fed to the energy storage system.

Reducing the thickness of the heat conducting element is, in turn, advantageously associated with a reduction in the total installation space of the energy storage system. Moreover, dividing the function of the electric insulation between the heat conducting element and the reinforcement layer represents an increase in safety since, in the case where the heat conducting element is pierced by one of more energy storage cells, for example, the function of electric insulation continues to be performed by the reinforcement layer. There is furthermore no need for this purpose of a further (additional) element, thereby advantageously making it possible to keep down the total number of elements in the energy storage system.

According to another aspect of the invention, the reinforcement layer can be connected materially to the heat exchanger. The improved transition between the reinforcement layer and the heat exchanger is associated here with improved heat conduction.

According to another aspect of the invention, the reinforcement layer can be formed from a ceramic or from a ceramic substance, in particular from an oxide ceramic. The provision of a reinforcement layer composed of a ceramic or of a ceramic substance provides the advantage that the stability of the surface of the heat exchanger is improved since ceramic has excellent mechanical properties, which bring about high resistance to deformation of surface structures.

According to another aspect of the invention, the reinforcement layer can be an aluminum oxide layer ($Al_2O_3$), at least in some region or regions, in particular completely. An aluminum oxide layer of this kind is associated with simplicity of manufacture and with good properties, namely with excellent mechanical properties, as well as good thermal conductivity and high electric resistance. As a result, the mechanical stability of the heat exchanger is advantageously increased and, at the same time, a risk of short-circuiting of the energy storage cells can also be lowered.

According to another aspect of the invention, the heat exchanger can be formed from an oxidizable metal, in particular from aluminum and/or an aluminum alloy. This advantageously improves the thermal conductivity of the temperature management system of the energy storage module. At the same time, the reinforcement layer can advantageously be connected in a stable manner to the heat exchanger.

According to another aspect of the invention, the heat exchanger can have flow channels and/or geometric structures, in particular fins, to increase an external and/or internal surface area or of the heat exchanger, wherein a fluid flows through the flow channels, in particular gas, a gas mixture, a gas/liquid mixture, water or a water/glycol mixture. This advantageously improves heat dissipation from or heat supply to the energy storage cells. In particular, it is then possible, if heat is generated in the energy storage cells during operation of the energy storage module, for the heat to be dissipated easily from the energy storage module. It is also optionally conceivable, in the case of low external temperatures, to feed heat to the energy storage module in order to ensure an optimum operating temperature, in particular an optimum temperature range.

However, it is equally conceivable to provide latent heat storage materials, e.g. zeolites, instead of the fluid.

According to another aspect of the invention, the heat conducting element can be formed from a silicone or a silicone-based material. This offers the advantage that good contact is formed between the heat conducting element and the multiplicity of energy storage cells, on the one hand, and the reinforcement layer, on the other hand. The flexibility of the silicone or silicone-based material furthermore makes it possible to compensate tolerance fluctuations and/or length changes in the energy storage cells. This leads to more reliable heat conduction into and out of the energy storage module.

According to another aspect of the invention, the heat conducting element can be formed from a thermoplastic-based material. Here too, the flexibility of the thermoplastic-based material enables a good contact to be formed between the heat conducting element and the cells or the heat conducting element and the reinforcement layer, as a result of which, in turn, the conduction of heat into and out of the energy storage module is improved. Moreover, thermoplastic-based materials are simple to process, which may advantageously reduce manufacturing costs.

However, it is equally conceivable for the heat conducting element to have one or more layer(s) of varnish or to be composed of one or more layers of varnish, wherein the layers of varnish preferably have good thermal properties, in particular high thermal conductivity. Moreover, the outer surfaces of the heat exchanger with the reinforcement layer and/or the outer surfaces of the energy storage cells can also have one or more layers of varnish. It is thereby advantageously possible to reduce the thickness of the heat conducting element and thus to reduce the thermal resistance between the energy storage cells and the heat exchanger, which depends inter alia on the thickness of the elements to be crossed. Moreover, a layer of varnish can advantageously be produced and applied easily, this being associated with a reduction in manufacturing and assembly costs.

According to another aspect of the invention, the heat conducting element can be designed as a thermal compound or as a heat transfer pad.

According to another aspect of the invention, the energy storage module can furthermore have a housing for accommodating the multiplicity of energy storage cells in the interior of the housing, wherein the housing has a top side, a bottom side and a multiplicity of side wall elements connecting the top side and the bottom side, wherein the side wall elements are connected to one another circumferentially in such a way that the side wall elements delimit the interior, and wherein the bottom side and the top side are of open design, at least in some region or regions, in particular completely. This results in the advantage that the interior of the housing is accessible from two sides. It is thereby possible to simplify the assembly of an energy storage module of this kind. Moreover, maintenance or replacement of individual components of the energy storage system, e.g. individual energy storage cells, is also made easier.

Moreover, it is quite conceivable for the interior of the housing to be already fully delimited, i.e. closed, at least on the top side. A completely delimited interior advantageously makes it possible to define or control flows of substances. Moreover, there is, on the one hand, the result that the ingress and/or egress of moisture is only permitted in a defined manner via corresponding components, e.g. lead-through unit, dehumidification unit, valve etc.) and, on the other hand, that a defined discharge of substances which have got into the interior of the module from the interior of the cells to the environment (venting) is made possible.

According to another aspect of the invention, the housing can be connected or is connected to the temperature management system, in particular can be connected or is connected to the heat exchanger via the reinforcement layer, more specifically in such a way that the bottom side of the housing is closed with the aid of the temperature management system. It is thereby advantageously possible to integrate various functions into one element, which advantageously reduces the total number of components.

According to another aspect of the invention, the top side of the housing can be designed to be closed by means of a lid element, wherein the lid element preferably has a positive terminal and a negative terminal. As a result, insertion of energy storage cells or replacement of energy storage cells can advantageously be made easier since the cells are accessible from above.

In this context, attention may be drawn to the fact that a defined transfer of substances, i.e. transfer of defined substances under defined conditions, into the interior of the housing or out of the interior of the housing, is made possible, even when the housing is closed.

According to another aspect of the invention, the energy storage cells can be lithium-ion cells, wherein the energy storage cells are preferably designed as lithium-ion pouch cells.

However, it is equally conceivable to select the energy storage cells from the following: round cells, prismatic energy storage cells comprising folded electrodes and/or prismatic energy storage cells comprising stacked electrodes, wherein prismatic energy storage cells comprising stacked electrodes have the best performance in this context.

According to another aspect of the invention, the energy storage cells can be designed as jelly rolls. It is thereby advantageously possible to reduce the space used, and to do so without reducing power or capacity.

According to another aspect of the invention, the energy storage module can furthermore have an electronics carrier, which is designed to receive a multiplicity of electronic devices, e.g. a multiplicity of sensors, at least one processor and/or at least one storage device. As a result, it is a simple matter to arrange electronic devices within the energy storage module, and to do so without unnecessarily high outlay on cabling. On the one hand, this can simplify the production and assembly of the energy storage module and can furthermore also reduce costs.

According to another aspect of the invention, the energy storage module can have one or more busbars for the electrical connection of the multiplicity of energy storage cells.

According to another aspect of the invention, the energy storage module can furthermore have a measuring line for picking off current and/or voltage values of individual, several and/or all energy storage cells. This advantageously makes it possible to monitor the ability to function of the energy storage module or of individual energy storage cells.

According to another aspect of the invention, it is possible to specify an energy storage system which has at least one energy storage module described above and a system housing for accommodating the at least one energy storage module. In this case, the energy storage module has a temperature management system, which has a heat exchanger and a heat conducting element. A reinforcement layer is provided between the heat exchanger and the heat conducting element, wherein the reinforcement layer has a higher modulus of elasticity than the heat exchanger.

The known problems can be solved by the provision of a temperature management system according to the invention. Thus, a reinforcement layer between the heat conducting element and the heat exchanger leads to a higher mechanical and thermal stability of the surface of the heat exchanger. By virtue of the fact that the surface pressure between the energy storage cells, the heat conducting element and the heat exchanger with the reinforcement layer can in each case be dependent inter alia on the modulus of elasticity, the thickness and area of the heat conducting elements and a force which acts via surfaces of the energy storage cells on the heat conducting element and is absorbed by the heat exchanger, continuous reliable contact is provided. The reinforcement layer is furthermore designed in such a way as to provide electric insulation and, by virtue of the high mechanical resistance thereof, to prevent penetration of conductive parts, in particular direct contact between the energy storage cells and the heat exchanger.

Moreover, the thermal conductivity of the temperature management system is also not impaired, in particular by virtue of a suitable choice of reinforcement layer, thereby furthermore enabling heat to be dissipated from the energy storage module or heat to be fed into the energy storage module.

Moreover, the reinforcement layer should preferably be as hard as possible, i.e. at least substantially nondeformable. Nevertheless, the elastic properties of the temperature management system, in particular of the heat exchanger with the reinforcement layer, can be maintained virtually constant, while the surface hardness of the heat exchanger with the reinforcement layer is simultaneously high.

The invention is described in detail below, including regarding further features and advantages, using the description of embodiments with reference to the accompanying drawings.

In the figures.

The energy storage system according to the invention is described in greater detail below with reference to the illustrations in the figures. Identical or equivalent elements and functions are provided with the same or similar reference characters.

Energy storage systems which are based on lithium-ion technologies are suitable, in particular, for use in vehicles 200. Moreover, an energy storage system of this kind can likewise be used wherever energy storage systems with a relatively high power density and/or with a relatively high energy density are required. Energy storage systems of this kind generally have at least one energy storage module 100.

The energy storage system is described in such a way below that relative terms refer to the installed state of the energy storage system. Thus, "in an upper region" means in a region which is at the top when viewed in the installed state, "in a lateral region" means in a region which is situated in a front, rear, left-hand or right-hand region in the installed state and viewed in the direction of travel, and "in a lower region" means in a region which is at the bottom when viewed in the installed state, for example.

Figure 1:
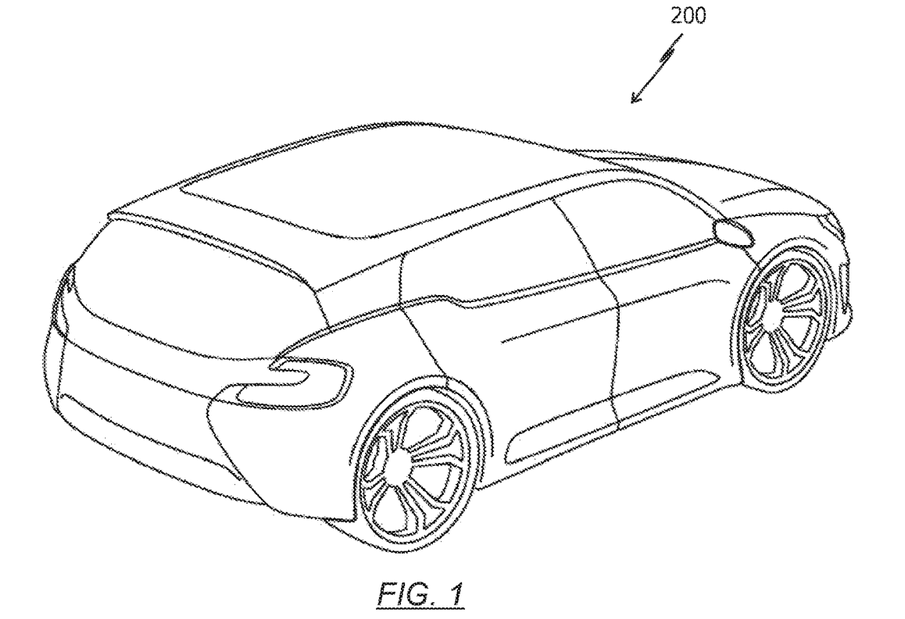
FIG. 1 shows a schematic representation of a vehicle.

FIG. 1 shows a schematic representation of a vehicle 200. In this case, the energy storage system can be arranged in a region of the vehicle 200 which is at the front in the direction of travel, in a rear end region of the vehicle 200 and/or in a region underneath the seats, in particular underneath the driver's seat.

The vehicle 200 can be an aircraft or a watercraft, a rail vehicle, an all-terrain vehicle, or preferably a road vehicle, wherein a road vehicle can mean a passenger vehicle, a truck, a bus, or a motor home. However, it is equally conceivable for the vehicle 200 also to be designed as any construction machine, electric scooter, electric bicycle, lawnmower, wheelchair or the like.

The vehicle 200 is driven by a drive unit. The drive unit can comprise a Stirling engine, an internal combustion engine, an electric motor or a combination thereof. A vehicle 200 which is driven exclusively by an electric motor is referred to as an electric vehicle. A vehicle 200 which has both an electric motor and an internal combustion engine is referred to as a hybrid vehicle. Hybrid vehicles can furthermore be subdivided into microhybrid vehicles, mild hybrid vehicles, full hybrid vehicles and/or plug-in hybrid vehicles. Here, plug-in hybrid vehicles can be taken to mean any hybrid vehicle which is not only charged by means of the internal combustion engine but can likewise be charged by means of the power grid or other energy sources not connected to a power grid. Full hybrid vehicles means vehicles which can be driven exclusively by means of the electric motor. Microhybrid vehicles have a start-stop functionality and preferably also have a stop-in-motion functionality. Moreover, microhybrid vehicles can charge the energy storage system by "brake energy recovery". Mild hybrid vehicles can furthermore have a boost function, which is used to assist the internal combustion engine to increase power.

Figure 2:
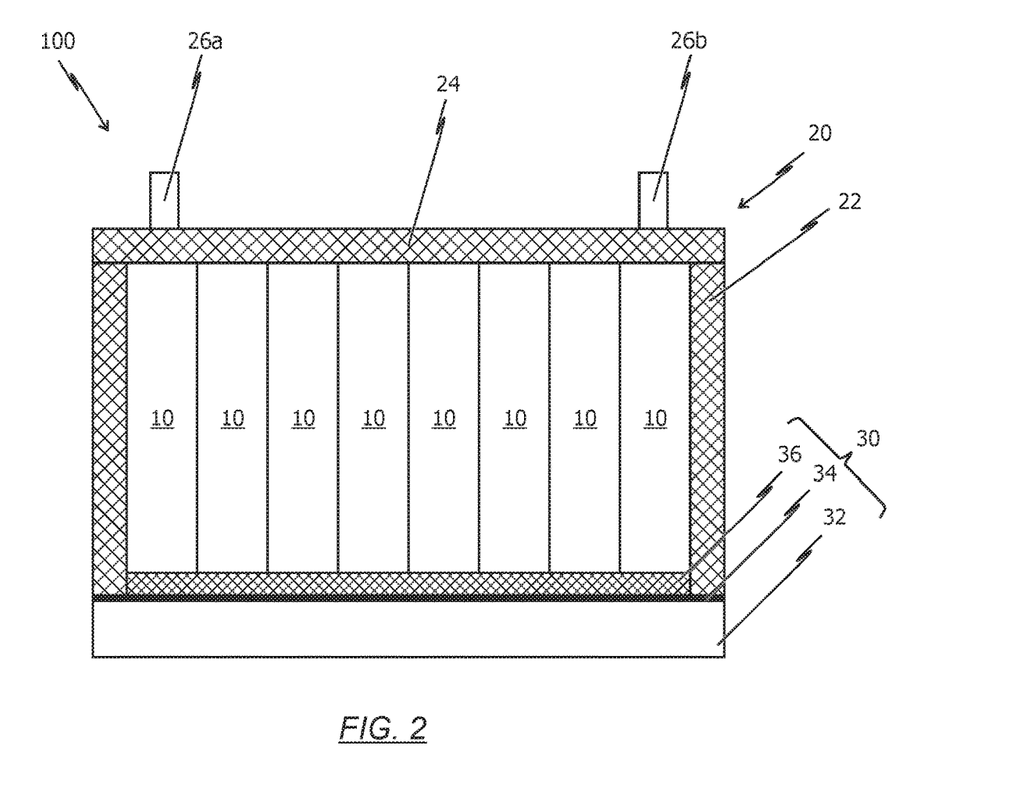
FIG. 2 shows a schematic representation of an energy storage system according to the present invention.

FIG. 2 shows a schematic section through an energy storage module 100 according to the invention. According to this, a multiplicity of energy storage cells 10 is arranged in an interior of a housing 20 of the energy storage module 100. In this case, the housing 20 has a top side and a bottom side, wherein a multiplicity of side wall elements 22 is arranged between the top side and the bottom side, said elements being connected to one another circumferentially in such a way that the side wall elements 22 delimit the interior of the housing 20. The top side and the bottom side are of open design, at least in some region or regions, in particular completely.

Provision is made here to enable the top side to be closed with the aid of a lid element 24. In this case, the lid element 24 can have a positive terminal 26a and a negative terminal 26b. Here, the positive terminal 26a and the negative terminal 26b can be connected to the corresponding electrodes of the energy storage cells 10, more specifically in such a way that the current output by the energy storage cells 10 can be output to electric consuming units or loads, which are connected to the positive and the negative terminal 26a, 26b, or that energy can be fed to the energy storage cells 10 from the outside via the positive and the negative terminal 26a, 26b, e.g. during a charging process. However, the lid element 24 can equally well have an at least substantially flat positive and a negative electric contact surface instead of the positive and the negative terminal 26a, 26b. This advantageously reduces the size, in particular the height, of the energy storage module 100.

Here, the lid element 24 can be connected materially and/or nonpositively to the multiplicity of side wall elements 22. For example, the lid element 24 can be connected to the side wall elements 22 by means of a screwed joint.

The housing 20, i.e. the multiplicity of side wall elements 22 and the lid element 24, can be manufactured from plastic, at least in some region or regions, in particular completely, to enable the energy storage module 100 to be produced with the lowest weight possible. Examples of materials that can be chosen here are an acrylonitrile butadiene styrene, polycarbonate, polyamide, polyvinyl chloride, polyethylene terephthalate, polyoxymethylene, polyolefin or a copolymer thereof. It is also conceivable for the housing 20 to be manufactured from glass, water glass, ceramic or the like. It should be noted here that the positive and the negative terminal 26a, 26b or the positive and the negative electric contact surface of the lid element 24 are manufactured from electrically conductive material.

In order furthermore to enable the housing 20, in particular the housing 20 made of plastic, to be sealed off with respect to the environment, it is additionally possible here to provide a barrier layer for sealing arranged on the housing 20 in the direction of the interior. Here, the barrier layer is designed in such a way that it is impermeable or only slightly permeable with respect to gases and/or liquids. Such a barrier layer can be built up from metal, metal oxide and/or silicates, especially aluminum and/or aluminum oxide. In this case, the barrier layer is advantageously connected materially to the housing 20 in the direction of the interior, it being possible, for example, for the barrier layer to be vapor-deposited onto internal surfaces of the housing 20.

The bottom side of the housing 20 can be closed or closable with the aid of a temperature management system 30. The temperature management system 30 is designed to keep the interior of the energy storage module 100 or of the energy storage system, in particular the multiplicity of energy storage cells 10, in a predefined or predefinable temperature range, which corresponds to an optimum working temperature range of the multiplicity of energy storage cells 10. A predefined or predefinable temperature range is, for example, −20° C. to 60° C., preferably −10° C. to 40° C., particularly preferably 0° C. to 30° C.

Here, the temperature management system 30 has a heat exchanger 32 and a heat conducting element 36. In this case, a reinforcement layer 34 for the structural reinforcement of the surface of the heat exchanger 32 is provided between the heat exchanger 32 and the heat conducting element 36, at least in some region or regions, in particular over the entire surface of the heat exchanger 32.

In this arrangement, the reinforcement layer 34 is arranged on a surface of the heat exchanger 32 in the direction of the interior of the housing 20 or in the direction of the multiplicity of energy storage cells 10. Here, it is possible, in particular, for the reinforcement layer 34 to be connected materially to the heat exchanger 32.

In this context, the reinforcement layer 34 can have a layer thickness of 50 μm to 500 μm, preferably 100 μm to 400 μm, particularly preferably 150 μm to 300 μm, very particularly preferably about 200 μm.

It is furthermore conceivable for aluminum plates coated with aluminum oxide to be provided between two adjacent energy storage cells 10 or between an energy storage cell 10 and an adjacent side wall of the housing 20 in order to transfer the heat from the lateral surfaces of the energy storage cells 10 in the direction of the temperature management system 30 or in order to transfer the heat from the temperature management system 30 to the lateral surfaces of the energy storage cells 10.

The reinforcement layer 34 has a higher modulus of elasticity than the heat exchanger 32. The provision of such a reinforcement layer 34 thus greatly increases the mechanical stability of the surface of the heat exchanger 32. However, it should be noted that the effect of the structural surface reinforcement of the heat exchanger 32 occurs only in a region close to the reinforcement layer 34; this effect decreases with increasing distance from the surface facing the reinforcement layer 34, when viewed over the thickness of the heat exchanger 32. At the same time, the reinforcement layer 34 has a relatively high thermal conductivity with a high electric resistance, this, in turn, providing protection for the energy storage cells 10 from any short circuits.

At the same time, it should be noted that the reinforcement layer 34 very largely or completely assumes the function of electric insulation. In this context, tests have shown that the electric resistance of the reinforcement layer 34 is in the gigaohm range.

For example, it has been observed that, when a 12 V voltage is applied to a reinforcement layer 34 according to the invention, an electric current of 0.12 nanoamperes flows, corresponding to an electric resistance of 100 gigaohms, and that, when a 400 V voltage is applied to a reinforcement layer 34 according to the invention, an electric current of 0.4 microamperes flows, corresponding to an electric current of 1 gigaohm.

Other tests have shown, for example, that when a 12 V voltage is applied to a reinforcement layer 34 according to the invention with a thickness of 200 micrometers and with a surface area of 0.01 square meters at a temperature of 20 degrees celsius, an electric current of 0.6 nanoamperes flows, corresponding to an electric resistance of 20 gigaohms. Even when a 400 V voltage is applied, a reinforcement layer 34 according to the invention with a thickness of 200 micrometers and with a surface area of 0.01 square meters has an electric resistance of 20 gigaohms, corresponding to an electric current of 20 nanoamperes.

It has also surprisingly been found that the electric resistance remains stable and relatively high even at very high temperatures. Thus, it was possible to show that when a 12 V voltage is applied to a reinforcement layer 34 according to the invention with a thickness of 200 micrometers and with a surface area of 0.01 square meters at 1000 degrees celsius, an electric current of 60 microamperes flows, corresponding to a resistance of 200 kiloohms. The same value for the electric resistance was also determined when a 400 V voltage was applied to a reinforcement layer 34 according to the invention with a thickness of 200 micrometers and with a surface area of 0.01 square meters at 1000 degrees celsius, corresponding to an electric current of 2 milliamperes.

In this way, it is advantageously possible to mitigate the consequences of a "thermal runaway". A "thermal runaway" means overheating of an exothermic chemical reaction or of a technical system owing to a self-reinforcing heat-producing process. In general, a runaway of this kind can cause destruction of the system (due to excess pressure) and, as a consequence, can lead to a fire or explosion. In particular, temperatures of over 600 degrees celsius occur in such a state. While the protective properties of conventional heat conducting elements are very small at such high temperatures, and therefore energy storage cells may penetrate the heat conducting element, the reinforcement layer 34 according to the invention remains mechanically, thermally and electrically stable. Thus, the safety of energy storage modules 100 and/or energy storage systems which have a temperature management system 30 with a reinforcement layer 34 according to the invention can be greatly increased.

Moreover, the reinforcement layer 34 can also protect against any short circuits of the energy storage cells, e.g. in a case in which the heat conducting element 36 becomes brittle and, particularly due to the effect of external forces, e.g. vibrations and/or shocks caused by vibration, breaks. In such a scenario, direct contact between the energy storage cells 10 and the reinforcement layer 34 (or between the heat exchanger 32 and the reinforcement layer 34) may then occur. Here, the high electric resistance of the reinforcement layer 34 prevents a short circuit.

The reinforcement layer 34 can be formed from a ceramic. The ceramic is preferably an oxide ceramic, e.g. zirconium oxide ($ZrO_2$), magnesium oxide (MgO), aluminum oxide reinforced with zirconium oxide (ZTA), or aluminum oxide ($Al_2O_3$). By virtue of the excellent mechanical properties of ceramics, or oxide ceramics, the mechanical stability of the surface of the heat exchanger 32 to which the reinforcement layer 34 is applied can be improved, as a result of which the thermal conductivity and electric resistance, in particular, remain relatively high, that is to say that the reinforcement layer 34 has a relatively high thermal conductivity and is nevertheless electrically insulating. At the same time, the elastic properties of the underlying layer, i.e. of the heat exchanger 32, are advantageously maintained, at least substantially.

In particular, the reinforcement layer 34 can be manufactured by converting the material layer on the outermost surface of the heat exchanger 32 (in the direction of the interior of the energy storage module 100), with the result that the reinforcement layer 34 and the heat exchanger 32 form a stable material joint.

At the same time, the application of an (oxide) ceramic layer of this kind is known and, as a result, can be carried out easily and at low cost, e.g. by sintering. It is also possible to apply a layer of aluminum oxide to a base made of aluminum, e.g. by means of an anodic oxidation (i.e. by anodizing).

The heat exchanger 32 can preferably be manufactured from aluminum and/or from an aluminum alloy. However, the heat exchanger 32 can equally well also be manufactured from any other suitable, in particular oxidizable, metal.

Here, aluminum has a modulus of elasticity of about 70 GPa, magnesium a modulus of elasticity of about 40 GPa, titanium a modulus of elasticity of about 116 GPa, for example; the modulus of elasticity of oxide ceramics is approximately in a range of from 150 GPa to 450 GPa, preferably 300 GPa to 400 GPa, particularly preferably 350 GPa to 400 GPa. Aluminum oxide has a modulus of elasticity of 250 GPa to 350 GPa.

The heat exchanger 32 can furthermore have a multiplicity of geometric structures, in particular fins, to increase the external and/or internal surface area of the heat exchanger 32 in order to allow better heat exchange. It is also possible for a multiplicity of flow channels, through which a fluid is passed, to be provided in the heat exchanger 32. As a fluid it is possible to use a gas or a gas mixture, especially air, water and/or a water/glycol mixture. However, it is furthermore also conceivable to provide a latent heat storage material, e.g. a zeolite, instead of the fluid.

In particular, it is possible here for the heat exchanger 32 to be manufactured from aluminum and to be provided with a reinforcement layer 34 made of aluminum oxide, which is connected materially to the heat exchanger 32 by anodizing.

In particular, the temperature management system 30 is designed to dissipate from the energy storage module 100 heat which arises during the operation of the energy storage cells 10 and/or to feed heat into the energy storage module 100 in order to keep the temperature of the energy storage cells 10 or of the energy storage module 100 in a controlled manner within a predefined or predefinable temperature range. For this purpose, some, in particular all, of the energy storage cells 10 are in direct and/or indirect contact with the heat conducting element 36 of the temperature management system 30. In this case, the heat conducting element 36 is designed, on the one hand, to compensate for length tolerances or tolerance fluctuations and/or length differences of the energy storage cells 10 and/or inaccuracies in the assembly of the energy storage module 100 and, on the other hand, also to compensate for irregularities in the surface of the reinforcement layer 34, which is in contact or comes into contact with the heat conducting element 36. Owing to the evolution of heat and changes in the electrode thickness (of the energy storage cells 10) due to a change in the electric charge, which plays an important role especially in the case of pouch cells, and/or different gas pressures during operation, the energy storage cells 10 can expand and contract. Such a change in length, especially if individual energy storage cells 10 expand or contract differently from other energy storage cells 10, can be compensated by means of the heat conducting element 36. It is thereby advantageously possible to ensure continuously good contact between the multiplicity of energy storage cells 10, on the one hand, and the reinforcement layer 34 and the heat exchanger 32, on the other hand.

At least in some region or regions, the heat conducting element 36 is arranged on the reinforcement layer 34, in particular on the surface of the reinforcement layer 34 in the direction of the interior of the housing 20 of the energy storage module 100, more specifically in such a way that the heat conducting element 36 is bounded laterally by the side wall elements 22 of the housing 20. That is to say that the heat conducting element 36 is provided in the interior of the housing 20, between the energy storage cells 10 and the reinforcement layer 34.

The heat conducting element 36 is provided between the energy storage cells 10 and the reinforcement layer 34 in order, in particular, to improve the transition between the relatively hard surfaces of the energy storage cells 10 and the reinforcement layer 34. For this purpose, the heat conducting element 36 is of softer and/or more flexible design than the reinforcement layer 34 and than cell housings, each surrounding one energy storage cell 10. It is thereby possible, for example, to compensate static and/or dynamic length differences of the energy storage cells 10. In this context, static length differences means a production- and/or assembly-related length difference of the energy storage cells 10 relative to one another, and the dynamic length differences means a change in the length of the individual energy storage cells 10 caused by external factors, e.g. operationally induced heating of the energy storage cells 10.

In this case, the heat conducting element 36 can be designed as a thermal compound or heat transfer pad. Here, the heat conducting element 36 can be manufactured from a silicone or a silicone-based material. However, it is likewise also conceivable to use a thermoplastic-based material. A silicone mat, a silicone rubber film with an optional glass fiber fabric or a plastic film based on a polyimide, polyethylene terephthalate, a polyamide and/or a polycarbonate with or without additives can be used, for example. The use of a silicone oil with components of zinc oxide and/or aluminum oxide is also conceivable.

It is equally conceivable to use a layer of varnish or a varnish layer system which comprises at least two (different and/or identical) layers of varnish, as a heat conducting element 36. Here, the layer of varnish or varnish layer system comprises a thermally conductive varnish, which can contain fillers. As a result, the heat conducting element 36 provided can advantageously be very thin, this, in turn, lowering the thermal resistance between the energy storage cells 10 and the heat exchanger 32, which depends inter alia on the thickness of the elements to be crossed (i.e. of the heat conducting element 32 and the reinforcement layer 34). Moreover, a layer of varnish can advantageously be produced and applied easily, this being associated with a reduction in manufacturing and assembly costs.

Moreover, the outer surfaces of the heat exchanger 32 with the reinforcement layer 34 and/or the outer surfaces of the energy storage cells 10 can be surrounded by one or more layers of varnish.

It is furthermore conceivable, under certain circumstances, to arrange the energy storage cells 10 directly on the heat exchanger 32 with the reinforcement layer 34, provided that sufficiently high electric insulation is provided between respectively adjacent energy storage cells 10. In other words, it is possible to dispense with a heat conducting element 36 if sufficiently good thermal conductivity is provided between the energy storage cells 10 and the heat exchanger 32 with reinforcement layer 34. In this case, both the cell housings, each surrounding one energy storage cell 10, and the heat exchanger 32 preferably have a reinforcement layer 34 of this kind. In such an embodiment, the energy storage cells 10 can be arranged without further, additional elements. This is advantageously of great significance, at least for stationary energy storage systems, since the heat conducting element 36 and further elements for insulation between adjacent energy storage cells 10 are no longer required, thereby making it possible to reduce costs. Moreover, the installation space required for the energy storage module 100 or energy storage system is advantageously reduced.

Enclosing the individual energy storage cells 10 with a reinforcement layer 34 according to the invention (with or without a heat conducting element 36 between the energy storage cells 10 and the heat exchanger 32 with the reinforcement layer 34) furthermore provides the advantage that the safety of the energy storage module 100 and/or of the energy storage system is further increased.

Thus, in conventional energy storage systems, e.g. in a case in which an individual energy storage cell overheats, a very high temperature can be imposed locally on the heat conducting element, causing the heat conducting element to melt locally. Owing to the rising temperature, adjoining energy storage cells may likewise overheat and further damage the heat conducting element. As a result, several energy storage cells can come into direct contact with the heat exchanger, leading to a short circuit. Applying a reinforcement layer 34 according to the invention to the heat exchanger 32, on the one hand, and to the cell housings enclosing the energy storage cells 10, on the other, leads to an increase in the safety of the energy storage module 100 since the high electric resistance of the reinforcement layer 34 provides protection from a short circuit, even if several energy storage cells 10 penetrate the heat conducting element 36.

The energy storage module 100 has a multiplicity of energy storage cells 10, wherein the number of energy storage cells 10 is not limited to the number illustrated in FIG. 2. It is equally possible for fewer or more energy storage cells 10 to be provided in the energy storage module 100, depending on the desired capacity and/or voltage of the energy storage module 100.

Here, the energy storage cells 10 can be designed as lithium-ion cells, in particular lithium-ion cells which are designed as jelly roll cells. Furthermore, the energy storage cells 10 can be designed with a dedicated or without a dedicated cell housing, and the energy stored cells 10 can also be arranged in a cell carrier for easier positioning in the energy storage module 100. In order furthermore to ensure as little space as possible is used, the energy storage cells 10 are designed, in particular, as lithium-ion pouch cells.

However, it would equally well be possible to arrange a multiplicity of energy storage cells 10 in a deep-drawn heat conducting element mold composed of anodized aluminum.

It is also conceivable to use round cells, prismatic energy storage cells comprising folded electrodes and/or prismatic energy storage cells comprising stacked electrodes as energy storage cells 10, wherein the prismatic energy storage cells comprising stacked electrodes have the best performance in this context.

In order to output the current of the individual energy storage cells 10 collectively at the positive or negative terminal 26a, 26b of the energy storage module 100 or at the positive or negative contact surface of the energy storage module 100, the energy storage cells 10 can be connected electrically to one another by one or more busbars, being either connected electrically in series or electrically in parallel.

An electronics carrier can furthermore be provided in the energy storage module 100. This is designed to receive a multiplicity of electric devices, e.g. a multiplicity of sensors, e.g. temperature sensors, at least one processor and at least one storage device.

A measuring line for picking off current and/or voltage values of individual, several and/or all energy storage cells 10 can also be provided in the energy storage module 100. It is thereby advantageously possible to monitor the ability to function of individual, several and/or all energy storage cells 10 in the energy storage module 100.

Even if this is not illustrated explicitly in the figures, it is conceivable to design an energy storage system with at least one above-described energy storage module 100 and a system housing for accommodating the at least one energy storage module 100.

It is conceivable here for the temperature management system 30 not to be designed for each energy storage module 100 individually but to specify a temperature management system 30 for the entire energy storage system, i.e. a temperature management system 30 for a plurality of energy storage modules 100. In this case, the reinforcement layer 34 is, in particular, applied to the entire surface of the heat exchanger 32, whereas the heat conducting element 36 is provided for each energy storage module 100, for example, more specifically in a region in which the respective energy storage cells 10 of the respective energy storage module 100 are provided.

It is also equally conceivable to provide a heat conducting element 36 for each individual energy storage cell 10. In this case, individual flat heat conducting elements 36 can be bent substantially on a central axis perpendicular in the direction of longitudinal extent, more specifically in such a way that the heat conducting elements 36 form a substantially U-shaped configuration. It is thereby advantageously possible to cushion externally acting mechanical forces, further reducing the risk that the heat conducting elements 36 will be penetrated by the energy storage cells 10. In addition, the contact between the energy storage cells 10 and the heat exchanger 32 can also be improved by the elastic restoring force of the resilient heat conducting elements 36.

In order furthermore to enable the energy storage system to be provided in as space-saving a way as possible, the at least one energy storage module 100 has, in particular, a positive or negative electric contact surface. The respective positive and negative electric contact surfaces of the energy storage modules 100 can be electrically connected to respective positive and negative connection terminals of the energy storage system. Electric consuming units or electric loads are connected to the positive and negative connection terminals of the energy storage system.

An energy storage system of this kind is designed for use in a vehicle 200, in particular for use in a hybrid vehicle.

It should be noted that the temperature management system 30 must (necessarily) have the (multifunctional) reinforcement layer 34 in all the embodiments according to the invention. Here, the reinforcement layer 34 is, in particular, in direct contact with the heat exchanger 32. In the case in which the heat conducting element is or the heat conducting elements 36 are provided, the reinforcement layer 34 is arranged (directly) between the heat exchanger 32 and the heat conducting element 36 or heat conducting elements 36 and, in the case in which no heat conducting element 36 is provided, it is arranged (directly) between the multiplicity of energy storage cells 10 and the heat exchanger 32.

The following advantages (already described) are associated with the reinforcement layer 34: on the one hand, mechanical stability at the surface of the heat exchanger 32 is increased in the vicinity of the reinforcement layer 34; on the other hand, good electric insulation, even at very high temperatures, is formed by means of the reinforcement layer 34. Thus, the reinforcement layer 34 has a high electric resistance, which remains stable and relatively high, even at high temperatures.

At this point it should be noted that all the parts described above, viewed on their own or in any combination, in particular the details shown in the drawings, are claimed as essential to the invention. Amendments thereof are familiar to the person skilled in the art.

REFERENCE CHARACTER LIST

10 energy storage cell
20 housing
22 side wall elements
24 lid element
26a, 26b positive terminal, negative terminal
30 temperature management system
32 heat exchanger
34 reinforcement layer
36 heat conducting element
100 energy storage module
200 vehicle

The invention claimed is:

1. An energy storage module for use in a vehicle, wherein the energy storage module comprises:
   a multiplicity of energy storage cells; and
   a temperature management system associated with at least some of the energy storage cells, wherein the temperature management system has a heat exchanger and a heat conducting element, wherein a reinforcement layer is provided between the heat exchanger and the heat conducting element, and wherein the reinforcement layer has a higher modulus of elasticity than the heat exchanger.

2. The energy storage module of claim 1, wherein the reinforcement layer is connected materially to the heat exchanger.

3. The energy storage module of claim 1, wherein the reinforcement layer is formed from a ceramic or from a ceramic substance.

4. The energy storage module of claim 3, wherein the reinforcement layer is an $Al_2O_3$ layer.

5. The energy storage module of claim 1, wherein the heat exchanger is formed from aluminum, an aluminum alloy, or a combination thereof.

6. The energy storage module of claim 1, wherein the heat exchanger comprises flow channels, through which a fluid flows, geometric structures to increase an external, internal, or external and internal surface area of the heat exchanger, or a combination thereof.

7. The energy storage module of claim 1, wherein the heat conducting element is formed from a silicone or a silicone-based material.

8. The energy storage module of claim 1, wherein the heat conducting element is formed from a thermoplastic-based material.

9. The energy storage module of claim 1, wherein the heat conducting element is designed as a thermal compound or as a heat transfer pad.

10. The energy storage module of claim 1,
wherein the energy storage module furthermore has a housing for accommodating the multiplicity of energy storage cells in an interior of the housing, wherein the housing has a top side, a bottom side and a multiplicity of side wall elements connecting the top side and the bottom side, wherein the side wall elements are connected to one another circumferentially in such a way that the side wall elements delimit the interior, and wherein the bottom side and the top side are of open design, at least in some region or regions.

11. The energy storage module of claim 10,
wherein the housing can be connected or is connected to the temperature management system, more specifically in such a way that the bottom side of the housing is closed by means of the temperature management system.

12. The energy storage module of claim 10,
wherein the top side of the housing is designed to be closed by means of a lid element,
wherein the lid element has a positive terminal and a negative terminal.

13. The energy storage module of claim 1,
wherein the energy storage cells are designed as lithium-ion pouch cells.

14. The energy storage module of claim 1,
wherein the energy storage cells comprise jelly rolls.

15. The energy storage module of claim 1,
wherein the energy storage module further comprises an electronics carrier, which is designed to receive a multiplicity of electric devices.

16. The energy storage module of claim 1,
wherein the energy storage module furthermore has a busbar or a plurality of busbars for the electrical connection of the multiplicity of energy storage cells.

17. The energy storage module of claim 1,
wherein a measuring line for picking off current and/or voltage values of individual, several and/or all energy storage cells is furthermore provided in the energy storage module.

18. An energy storage system for use in a vehicle, wherein the energy storage system comprises:
at least one energy storage module having the configuration of claim 1; and
a system housing for accommodating the at least one energy storage module, wherein the at least one energy storage module has a temperature management system, which has a heat exchanger and a heat conducting element, wherein a reinforcement layer is provided between the heat exchanger and the heat conducting element, and wherein the reinforcement layer has a higher modulus of elasticity than the heat exchanger.

* * * * *

UNITED STATES PATENT AND TRADEMARK OFFICE
CERTIFICATE OF CORRECTION

PATENT NO. : 11,050,099 B2  
APPLICATION NO. : 16/332336  
DATED : June 29, 2021  
INVENTOR(S) : Bernhard Ehrlich et al.

Page 1 of 1

It is certified that error appears in the above-identified patent and that said Letters Patent is hereby corrected as shown below:

On the Title Page

Item (72), under "Inventors", in Column 1, Line 2, delete "Rubenberge" and insert -- Rübenberge --, therefor.

Item (56), under "FOREIGN PATENT DOCUMENTS", in Column 2, Line 3, delete "EP" and insert -- DE --, therefor.

In the Specification

In Column 1, Line 12, delete "SYSTEM" and insert -- SYSTEM, --, therefor.

In Column 1, Line 14, delete "DE 102016118864.8," and insert -- DE 102016118864.6, --, therefor.

In Column 4, Line 59, delete "one of more" and insert -- one or more --, therefor.

In Column 6, Line 44, delete "e.g." and insert -- (e.g. --, therefor.

In Column 12, Line 64, delete "continuously" and insert -- continuous --, therefor.

In Column 13, Lines 47-48, delete "heat conducting element 32" and insert -- heat conducting element 36 --, therefor.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*